United States Patent

[11] 3,555,295

[72] Inventor Wing N. Toy
Glen Ellyn, Ill.

[21] Appl. No. 674,834
[22] Filed Oct. 12, 1967
[45] Patented Jan. 12, 1971
[73] Assignee Bell Telephone Laboratories, Incorporated
Berkeley Heights, N.J.
a corporation of New York

[54] PARALLEL COUNTER
13 Claims, 7 Drawing Figs.

[52] U.S. Cl. ........................................ 307/224, 307/220, 328/48, 328/49, 235/92
[51] Int. Cl. ........................................ H03k 21/00
[50] Field of Search ........................................ 307/222, 223, 224; 307/225; 328/43, 44, 48, 49, 52.5; 235/92

[56] References Cited

UNITED STATES PATENTS

| | | | |
|---|---|---|---|
| 2,538,122 | 1/1951 | Potter | 328/48 |
| 3,192,406 | 6/1965 | Somlyody | 307/222 |
| 3,201,699 | 8/1965 | Maring | 328/49X |
| 3,264,567 | 8/1966 | Prieto | 328/48X |
| 3,349,332 | 10/1967 | Bleickardt | 328/49X |

*Primary Examiner*—Donald D. Forrer
*Assistant Examiner*—R. C. Woodbridge
*Attorneys*—R. J. Guenther and Kenneth B. Hamlin

ABSTRACT: A parallel counter using noncomplementing bistable circuits has coincidence gates associated with the bistable circuits to detect the lowest ordered counter stage in a reset state at the time of a counter input pulse. The gates are operative to set that counter stage and to reset all lower ordered stages. By using gates with different degrees of fan-in, the amount of delay in each counting operation can be correspondingly changed to produce a similar change in the input pulse repetition frequency that can be accommodated by the counter.

INVENTOR
W. N. TOY
BY
ATTORNEY

PARALLEL COUNTER

BACKGROUND OF THE INVENTION

1. Field of the Invention

This invention relates to parallel counters and it relates more particularly to such counters employing noncomplementing bistable circuits.

2. Prior Art

Parallel counters are adapted to operate so that all stages which are going to change state during a counting operation do so simultaneously rather than in the sequential, or rippling, fashion which is characteristic of conventional binary counters. Parallel counters which are known to the art generally employ binary cells as the basic elements of the counting arrangement. Such cells either utilize capacitive cross coupling of a pair of active circuit devices in a multivibrator type of arrangement or they employ at least an additional pair of active devices for performing the functions otherwise realized by the capacitive cross coupling. These two forms of binary cell are either inconvenient or quite complicated for use in integrated circuits. Capacitors are difficult to incorporate in integrated circuit systems, and they also impose a substantial limitation upon the operating speed of the binary cell because of the time needed for the capacitors to recover after each counting operation. The use of an extra pair of active devices increases the device size, material cost, and number of connections required. These types of binary cells are employed because many of the prior art parallel counters require bistable circuit complementing operations wherein an input pulse is applied to a complementing or toggling input connection for triggering the binary cell to its opposite state of operation regardless of the state in which the cell is operating at the time of the trigger pulse. There are other types of parallel counters which may use binary cells of simpler design, but in these other types the counter operation usually requires time delay circuits including inductive or capacitive circuit elements to be included in each counter stage. It was previously noted that it is inconvenient to include capacitive elements in integrated circuit form. However, insofar as inductive elements are concerned, there is at the present time no known practical way for incorporating such elements in integrated circuit form.

There are also additional parallel counter types known in the art which do not require bistable circuit complementing operations and which do not require specific additional delay circuit elements in each counting stage. However, these other types of parallel counters necessarily are operated on a multiphase basis, that is, they either employ two separate sources of input pulses, one for supplying pulses to be counted and the other source for initiating transfer operations between two ranks of storage elements within the counter, or they employ a single pulse source and steer the output pulses from that source to counter information input connections, and after a predetermined delay, to a counter transfer input connection.

It is, therefore, one object of the present invention to facilitate the construction of integrated counter circuits.

It is another object to reduce the number of circuit elements employed in bistable circuits of parallel counting arrangements.

A further object is to increase the speed capabilities of parallel counters.

STATEMENT OF THE INVENTION

The aforementioned and other objects of the invention are realized in an illustrative embodiment in which a parallel binary counter employs logic circuits to detect the least significant counter stage representing a first binary condition, e.g., a ZERO. The logic circuits respond to the coincidence of such condition and a counter input pulse to set the condition of that stage to the binary ONE state and to reset any lower order stage to ZERO. Counting operation in higher order stages is inhibited by the logic circuits.

It is one feature of the invention that the counter state detecting logic controls selected counter stages without requiring bistable circuit complementing input connections.

It is another feature that the logic circuits of each counter stage inherently supply the necessary time delay for preventing race conditions in addition to performing their normal logic functions. Such delay is thus provided by essentially nonreactive means.

Still another feature is that the counter operates on a single phase basis whereby the count state is advanced by one step for every input pulse applied thereto.

A further feature is that the use of logic circuits to control the state of a selected portion of counter bistable circuits permits a degree of flexibility wherein the counter can be implemented with different degrees of logic circuit fan-in to accommodate different types of logic gates, different counting unit lengths, and different numbers of gate delays. Thus, the input pulse repetition frequency which can be accommodated by the counter can be altered by changing the degree of fan-in of the counter logic circuits.

DESCRIPTION OF THE DRAWINGS

A more complete understanding of the invention and its various features, objects and advantages may be obtained from a consideration of the following detailed description in conjunction with the appended claims and the attached drawings in which:

DETAILED DESCRIPTION

Figure 1:
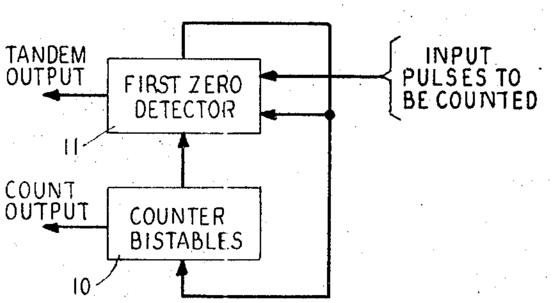
FIG. 1 is a conceptual block and line diagram of the invention.

In the conceptual block diagram of FIG. 1 counter bistable circuits 10 supply output signals to a first-ZERO detector 11 which includes logic circuits to indicate the bistable circuit in the lowest order counter stage that is in the reset state. The output of detector 11 is fed back to control the counter bistable circuits 10 and to maintain the outputs of the first-ZERO detector logic. Input pulses to be counted are supplied to logic gates of the first-ZERO detector 11 in a manner which will be hereinafter described. A counter output, e.g., for driving other counters in tandem, is derived from one or more of the counter stages at the detector 11. A count output for deriving the count information to be utilized by other circuits is derived from the bistables 10.

Figure 2A:
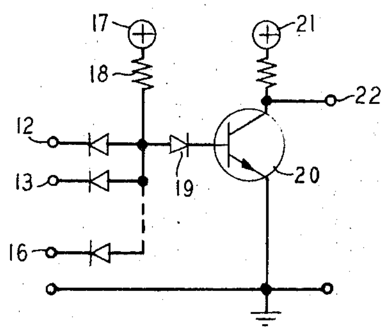
FIGS. 2A, 2B, and 2C are diagrams of basic diode-transistor logic employed in the circuits of the invention and the different schematic representations thereof.

FIG. 2A is a schematic diagram of a well-known diode-transistor logic NAND gate which is the basic circuit block of embodiments of the invention considered herein. Although resistors are employed in bias circuits, the term "diode-transistor logic" is used to indicate the use of diode inputs and transistor outputs. Plural information input connections 12, 13, and 16 are provided for supplying input signals with respect to ground, the coincidence of positive signals in the illustrated embodiment of the gate activates the gate by permitting current flow from a positive potential source 17 through a resistor 18 and a diode 19 to the base electrode of a transistor 20. This action drives transistor 20 into conduction and current flow therethrough from a further positive source 21 to ground places a gate output terminal 22 at essentially ground potential. The removal of any one of the positive input signals from the gate diverts current from the base electrode of transistor 20 thereby cutting off conduction in that transistor and causing the terminal 22 to rise to a potential corresponding approximately to that of the source 21. A gate of the type illustrated in FIG. 2 has a predetermined fixed inherent delay D in its operation. This delay is measured between the time of application of coincident signals to all of its input terminals and the attainment of ground at the terminal 22 or, conversely, the time between the removal of one of the coincident input signals and the attainment of the positive potential of source 21 at terminal 22. Normally the two delays are different. However, they will be assumed to have the same value D for simplicity. The significance of the delay D will be further considered in connection with FIGS. 3 and 4.

Figure 2B:
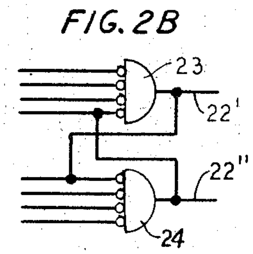

In FIG. 2B two NAND gates 23 and 24 are schematically represented in the conventional fashion for gates of the type shown in FIG. 2A. Only the information signal connections are shown in the schematic representation of a gate and the common ground connection and operating potential connections are understood. The gates in FIG. 2B are cross coupled to form a bistable circuit by interconnecting the output of gate 23 with one input of gate 24 and, similarly, connecting the output of gate 24 to one input of gate 23. Thus, only one of the two gates can be active, i.e., fully enabled, at any time because an active gate applies a disabling ground to the input of the other gate. In considering the present invention, bistable circuits of the type shown in FIG. 2B are generally triggered by removing a positive input signal, i.e., applying a ground signal, at an input of an active one of the bistable circuit gates. Output connections are arranged so that a ground input to gate 23 produces a positive output at lead 22′ on the same side of the bistable circuit; and, similarly, a ground input to gate 24 produces a positive output at lead 22″.

Figure 2C:
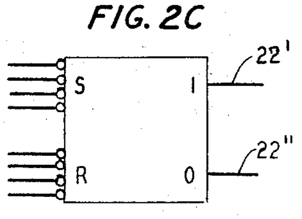

FIG. 2C illustrates the schematic representation of a bistable circuit formed in the fashion indicated in FIG. 2B. Bistable circuit setting input signals are applied to leads S in accordance with the usual convention and resetting signals are applied to input leads R. In the subsequent description of the embodiments of the present invention, the application of a ground signal to a setting input connection S of a bistable circuit disables the setting gate of the bistable circuit so that the binary ONE output connection 22′ goes to a positive level and the binary ZERO output connection 22″ goes to ground. This state of the bistable circuit is hereinafter designated the "set" or "binary ONE" state. Similarly, the bistable circuit is reset by applying a ground to a reset input connection R thereby disabling the reset gate of the bistable circuit and making the binary ZERO output 22″ positive and the binary ONE output 22′ ground. This reset state is sometimes also referred to as the "binary ZERO state" of the bistable circuit.

Figure 3:
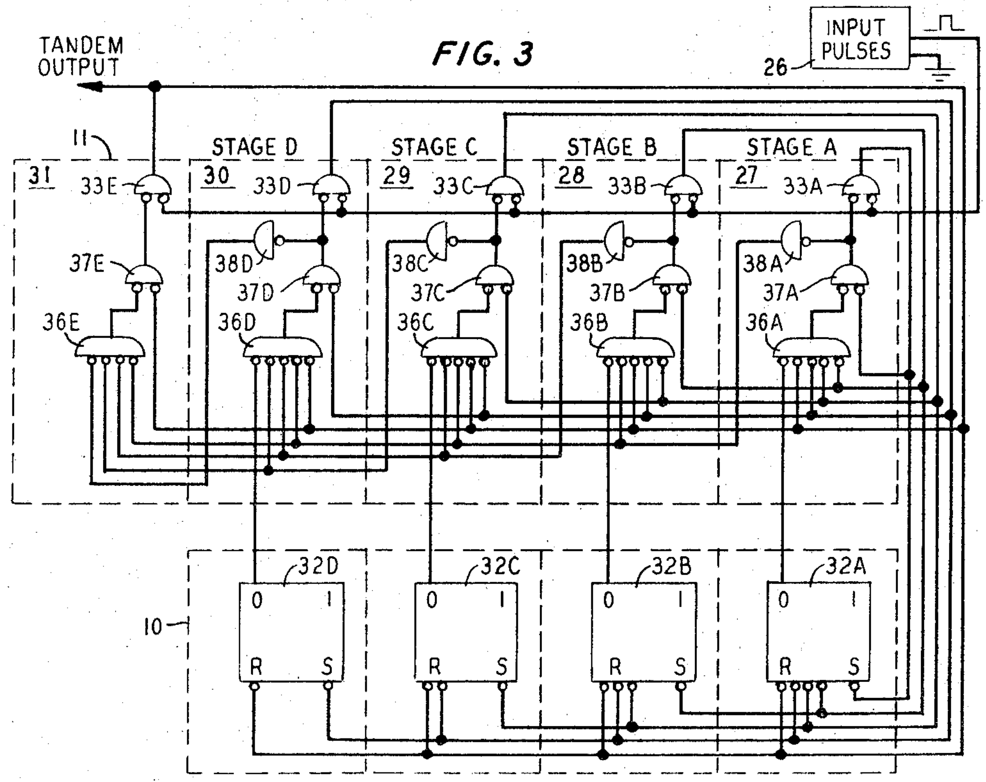
FIG. 3 is a schematic diagram of a four-stage counter in accordance with the invention.

In FIG. 3 input pulses from a source 26 are applied to the first-ZERO detector 11 of the *n*-stage counting arrangement of the present invention. Such pulses are applied in multiple to each of $n+1$ sections of the first-ZERO detector 11 for initiating a counting operation of the counter. In the embodiment of FIG. 3*n* is four and detector 11 has five sections 27, 28, 29, 30, and 31. The first *n* sections 27—30 of the detector each has a different one of a group of bistable circuits 32 associated therewith. For convenience in describing the operation of the invention, the four counter stages are designated A through D, inclusive. The additional detector section 31 is similarly designated E although it has no corresponding bistable circuit. Detector sections and corresponding bistable circuits are arranged in the sequence of increasing orders of binary significance from right to left in FIG. 3. Corresponding circuit elements of the respective stages and section 31 are designated by alphanumeric characters including a numeral designating a particular circuit element and a letter designating the counter stage, or detector section, in which the element appears.

Each of the sections 27—30 of the detector 11 includes four similarly arranged coincidence gates of the type illustrated in FIG. 2A. Section 31 is also similar but lacks one gate as will be described. In view of the similarities, only the gates in the counter stage A of lowest order of significance in the counter sequence need be specifically described. A first gate 33A receives at one input connection the pulses from the source 26 and it received at another input connection enabling or disabling signals which control the response of the gate 33A to those input pulses. The output of gate 33A is coupled to a setting input connection of the bistable circuit 32A in the same stage, and in other sections of detector 11 the output of the corresponding gate 33 is also applied to resetting inputs of bistable circuits 32 of lower orders of significance. The binary ZERO output of bistable circuit 32A is applied to a gate 36A which also receives inputs from each of the gates 33 in any detector sections of higher orders of significance.

The output of gate 36A is applied to an input of a further gate 37A which also receives at another input connection the output of gate 33A in the same section of detector 11. The output of the gate 37A is applied in multiple to an input connection of gate 33A and to the single input connection of a further gate 38A. A corresponding connection to a gate 38 is in all sections except the highest ordered section 31 which has no gate 38. Gate 38A provides an output signal to the gates 36 in all higher order sections of detector 11.

Considering now the overall operation of the counter stages of FIG. 3 taken together, let it be assumed that operation begins with all of the bistable circuits 32 in the reset state. In this state the binary ZERO outputs of circuits 32 are positive and enable gates 36. Gate 36A is active in the absence of input pulses from source 26. The ground output from gate 36A disables gate 37A and the positive output from the latter gate enables gate 33A to be responsive to input pulses and activates gate 38A to provide a ground inhibiting signal to higher order sections of detector 11. That inhibiting signal causes each of the gates 36B, 36C, 36D, and 36E to be disabled and thereby provide an enabling signal to their corresponding gates 37. The latter gates are all active in the absence of input pulses from source 26 and thereby supply ground disabling signals to their corresponding gates 33 and 38.

Source 26 supplies rectangular pulses that are positive with respect to ground and have a duration 3D, i.e., a duration corresponding to the inherent delay through three successive gates of the type in FIG. 2A. the first input pulse from source 26 is applied in multiple to all of the gates 33; but only the gate 33A is at that time enabled; and, therefore, only that gate is rendered active by the input pulse. The resulting ground output signal from gate 33A disables gate 37A thus keeping or latching the output of gate 33A at ground for the duration of 3D. At the same time, the output from gate 33A sets bistable circuit 32A. In the set state bistable circuit 32A disables gate 36A which, in turn, provides an enabling signal to gate 37A. By the time gate 37A has been thus enabled, the input pulse from source 26 has terminated thereby disabling gate 33A and causing a further enabling signal to be applied from the output of that gate to the other input of gate 37A. An active state prevails at the latter gate and the resulting ground output disables gates 33A and 38A. The new state of gate 38A changes the aforementioned inhibiting signal to an enabling signal for higher order sections of the detector 11.

The removal of the inhibiting signal from gate 36B in the second section of the counter activates that gate since the bistable circuit 32B is resting in its reset state. Accordingly, the ground output from gate 36B disables gate 37B so that the latter gate produces a positive output to enable gate 33B and activate gate 38B. Ground output from the latter gate inhibits gates 36 in sections 29 through 31 and thereby inhibits the operation of gates 33 in those sections. Consequently, only gate 33B is now enabled to respond to input pulses.

The second input pulse from source 26 activates gate 33B, and its ground output temporarily disables gates 36A and 37B and also sets bistable circuit 32B and resets bistable circuit 32A. After the end of the input pulse, gate 33B is disabled once more and its positive output enables gates 36A and 37B. The resetting of bistable circuit 32A restores the positive ZERO output therefrom for activating gate 36A and, in turn, disabling gate 37A, so that the latter gate supplies a positive enabling signal to gates 33A and 38A. The resulting ground output from the latter gate once more inhibits gates 36 in sections 28 through 31 of detector 11. Consequently, after the second input pulse from source 26, only gate 33A in the first counter stage is enabled to respond to further input pulses. At this point the only bistable circuit in the set state is the circuit 32B, and the resulting state of all the bistable circuits together is, in binary notation, 0010 which is the binary coded representation for two, thereby indicating that two input pulses have been received from source 26.

The third input pulse from source 26 activates gate 33A to set bistable circuit 32A thereby disabling the section 27 to respond to further input pulses and causing the inhibiting signal from gate 38A to be changed to an enabling signal. In this state the bistable circuit 32C is the lowest order circuit in the reset state. Consequently, its positive ZERO output permits gate 36C to be active thereby disabling gate 37C. A positive output from the latter gate enables gate 33C to respond to input pulses and also activates gate 38C. The ground output from the latter gate inhibits the operation of sections 30 and 31, as previously described for such inhibiting signals.

The fourth input pulse from source 26 activates gate 33C so that its ground output sets bistable circuit 32C and resets bistable circuits 32A and 32B. This action places the counter in the binary representation 0100 to show that four input pulses have been counted. The ground ZERO output from bistable circuit 32C disables gate 36C and thereby activates gate 37C in the absence of input pulses from source 26. Ground from gate 37C disables gate 33C and gate 38C so that the inhibiting output signal from the latter gate is removed. However, since the bistable circuit 32A is now in its reset state, the positive ZERO output signal therefrom causes gate 33A to be enabled to respond to input pulses and activates gate 38A to inhibit higher order sections of detector 11, as previously described. Upon the occurrence of the fifth pulse from input pulse source 26, bistable circuit 32A is set once more.

The further operation of the counter in FIG. 3 continues in the manner hereinbefore described until all of the bistable circuits 32 are in the set state, indicating that 15 input pulses have been received from the source 26. In that condition the ground ZERO output from each bistable circuit causes the gate 33 of the same counter stage to be disabled and causes the gate 38 of the same stage to provide a positive enabling signal to gate 36E. That gate is thus activated, and its ground output disables gate 37E. The positive output from gate 37E enables gate 33E to respond to input pulses and upon the occurrence of the sixteenth input pulse from source 26 gate 33E is activated. Its ground output is fed back to reset all of the bistable circuits 32, and the same output is also available for utilization in any appropriate manner for operating a different type of circuit or for operating a further counter unit (not shown) of the type herein described. Counter outputs can, of course, be taken at any one or more of the gates 33.

The illustrative counter of FIG. 3 has four stages, but the principles are equally applicable to counters of other sizes. A change in size also requires a change in the degree of fan-in at the input to gates 36 and at the reset inputs of bistable circuits 32.

Figure 4:
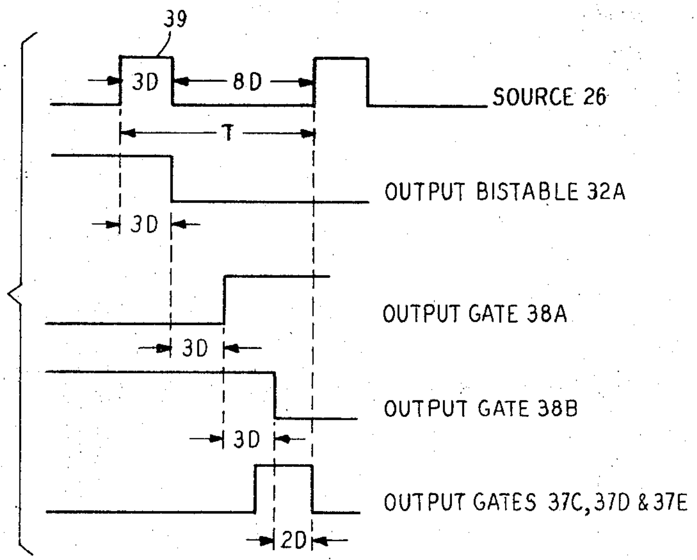
FIG. 4 is a timing diagram illustrating the operation of the counter of FIG. 3.

The timing diagram of FIG. 4 further illustrates the operation just described in relation to the first stage of the counter in FIG. 3. FIG. 4 shows that each of the input pulses from source 26 has a duration 3D corresponding to the delays through three successive logic gates of the type shown in FIG. 2A. The bistable circuit 32A responds to the first input pulse 39 substantially in coincidence with the termination of that input pulse because three delays are experienced through the gate 33A and the two gates of bistable circuit 32A which are operating essentially in tandem during a triggering operation. In like manner three further delays, a total of 6D from the leading edge of the input pulse, are required for the output of gate 38A to respond by removing its inhibiting output signal. These three delays are the ones required for gates 36A, 37A, and 38A to respond to the output of bistable circuit 32A. The new inhibit signal from gate 38B is established after another three delays, 9D after the leading edge of the input pulse, for the response of gates 36B, 37B, and 38B to the change in the output of gate 38A. The new inhibit signal is actually applied to higher order gates 33 after an additional two delays, 11D after the leading edge of the input pulse, for the response of corresponding gates 36 and 37 to settle after the change in the output of gate 38B. Thus, the minimum pulse repetition period that can be accommodated by the counter of FIG. 3 is 11D. It can be shown that certain operations of the counter are shorter than that shown in FIG. 4, but it is the longest there shown that determines minimum pulse repetition period. That period is significant for determining how rapidly input pulses can be applied.

However, the outputs of all bistable circuits that change during any counter operation settle at the same time and are available for external utilization after the initial 3D delay indicated in FIG. 4. Thus, even while logic circuit states are settling in the first-ZERO detector 11, the information contained in bistable circuits 32 can be usefully employed. Herein lies a significant advantage over sequential, or rippling, counters.

Figure 5:
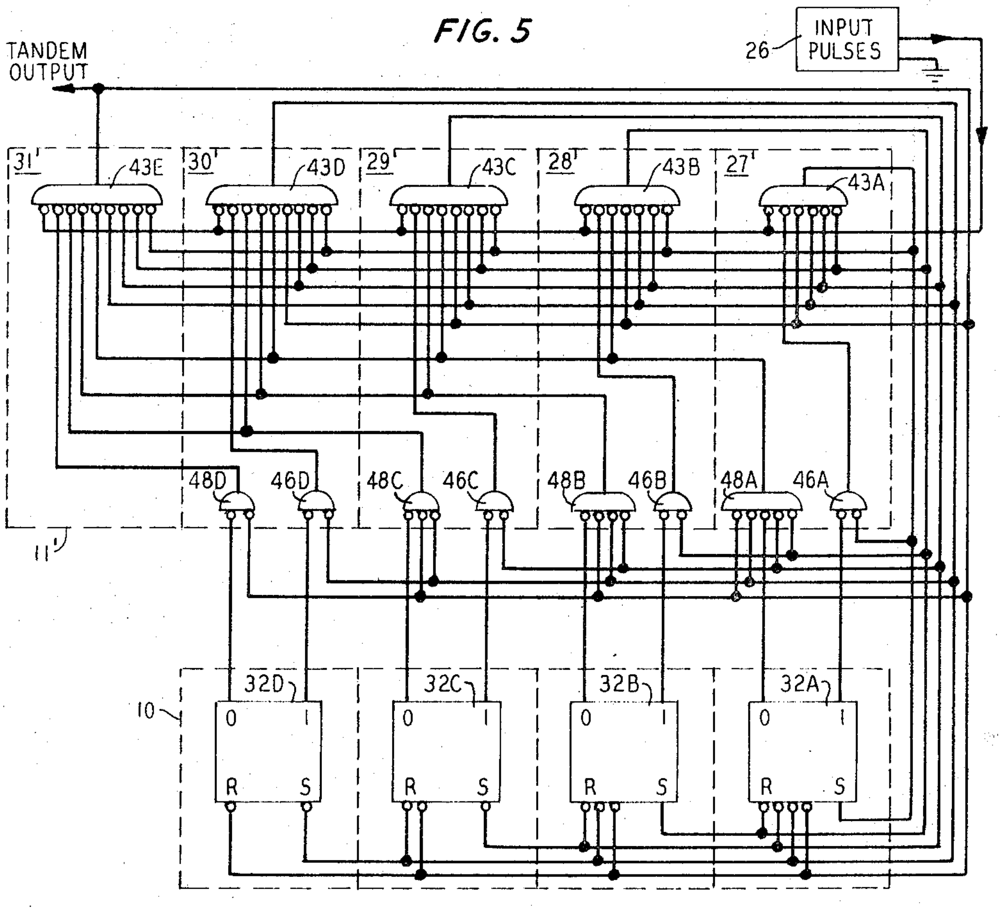
FIG. 5 is a schematic diagram of a modified four-stage counter in accordance with the invention.

The counter embodiment shown in FIG. 5 illustrates one way in which the degree of fan-in of logic gates in detector 11 can be changed for realizing certain advantages. In this case the degree of fan-in for detector gates 43, which correspond to the gates 33 in FIG. 3, is increased so that the number of gate delays in a counter operation can be correspondingly reduced and the input pulse repetition frequency increased.

In FIG. 5 the gates 43 respond to input pulses, to the outputs of all gates 43 in other sections of detector 11, to the binary ZERO output of the bistable circuit in the counter stage of next lower order of significance, and to the binary ONE output of the bistable circuit in its own counter stage. The bistable circuits in the various stages are arranged to be actuated in much the same fashion described in connection with FIG. 3 in that each bistable circuit is set by the output of the gate 43 in its own stage and is reset by the output of a gate 43 in any stage of higher order of significance. Each stage of the counter includes a gate 46A which responds to the coincidence of a disabled condition in the gate 43 of the same stage and to the positive ONE output of the bistable circuit in the same stage when that circuit is in its set state. A further gate 48 is included in each stage and responds to the coincidence of the positive ZERO output of the reset bistable circuit in the same stage and to the disabled state of gates 43 in all other sections of detector circuit 11′.

Operation of the circuit of FIG. 5 is conveniently considered with the initial assumption that all of the bistable circuits 32 are in the reset state. The positive ZERO output of the bistable circuit 32A in this state completes the enablement of gate 48A to activate that gate and thereby provide a ground inhibiting signal to the gates 43 in sections 28′ through 31′. The gate 46A is disabled by the ground ONE output of bistable circuit 32A and thus provides a positive enabling signal to gate 43A.

Upon the occurrence of a first input pulse from source 26, gate 43A is activated and provides a ground output for setting bistable circuit 32A. Upon the termination of that input pulse the positive ONE output of the bistable circuit activates gate 46A for providing a ground disabling signal to gate 43A. The ground ZERO output from bistable circuit 32A disables gate 48A thereby eliminating the aforementioned inhibiting signal from that gate to sections 28′ through 31′. Bistable circuit 32B is now the lowest ordered one in the reset state, and it operates through its gates 46B and 48B to enable the gate 43B and disable gates 43 in higher ordered stages in much the same fashion previously described in connection with stage A.

The second input pulse from source 26 activates gate 43B so that its ground output resets bistable circuit 32A and sets bistable circuit 32B. The section 27′ of the counter is now once more the only one which is enabled to respond to input pulses, and it does so respond on the next succeeding input pulse. The further operation of the counter of FIG. 5 continues in the manner hereinbefore described until all of the bistable circuits 32 are in the set state indicating that 15 input pulses have been counted. In that condition of the counter, gate 43E is enabled by positive outputs from all of the gates 48 and by the positive outputs of the gates 43A through 43D. Consequently, upon the occurrence of the $16^{th}$ positive-going input pulse from source 26, gate 43E is activated to produce a ground output signal which resets all of the bistable circuits 32.

The operating delays of the counter in FIG. 5 can be traced in the same fashion as was previously done for the counter of FIG. 3 in relation to FIG. 4. Thus, a delay of 3D is still required in FIG. 5 for bistable circuit 32A to settle after an input pulse has been applied from source 26. However, only one additional delay is needed for inhibit signals to be adjusted since any gates 46 and 48 that change state do so simultaneously. Consequently, the counter of FIG. 5 can accommodate a minimum pulse repetition period of 4D as compared to the 11D of FIG. 3.

Parallel counters of the type shown in FIGS. 3 and 5 operate on a single-phase basis in that the count produced is equal to the total number of input pulses applied to the counter after an all-reset counter state. All counter bistable circuits which change state in response to an input pulse do so simultaneously because they are all actuated by the same output of a single gate 33 that is activated by an input pulse to the counter. Consequently their binary ONE and ZERO outputs are available for utilization quickly and at the same time. No additional input pulse is required to transfer information between temporary storage locations without advancing the count. It will be observed in the described embodiments of the invention that certain pairs of logic gates in the first-ZERO detector are actually interconnected in the fashion of a bistable circuit. For example, in FIG. 3 gates 33A and 37A are so cross coupled. Such gate combinations do respond as bistable circuits in a counting chain as do the bistable circuits 32. Consequently, the counters of FIGS. 3 and 5 are double rank counter circuits operating on a single-phase basis.

It has been pointed out that the counters described herein are parallel counters with simultaneous operation of bistable circuits. There is no sequential rippling of bistable circuit states as is the case in sequential counters. Thus, the circuits described herein have the speed advantages of single-phase parallel counters, and they also have the advantages of requiring no capacitors or coils so that they are relatively easy to incorporate into integrated circuit systems.

Although the present invention has been described in connection with particular embodiments thereof, it will be understood that additional embodiments and modifications which will be obvious to those skilled in the art are included within the spirit and scope of the invention.

I claim:

1. In combination:

a plurality $n$ of bistable circuits having set and reset states and arranged in a predetermined ordered sequence;

a plurality of coincidence gates each having a first input connection for receiving pulses to be counted;

means coupling an output of each bistable circuit to a second input of different ones of said gates to enable such gates in response to the reset state of such bistable circuit;

means responsive to a pulse at said first input to an enabled gate actuating such gate for simultaneously setting the bistable circuit coupled thereto and resetting all of said bistable circuits of lower order of significance in said sequence; and means responsive to said resetting of a bistable circuit inhibiting all of said gates of higher order of significance in said sequence.

2. In combination:

a plurality of bistable circuits arranged in a predetermined ordered sequence and each having set and reset states of operation, each of said bistable circuits comprising a stage of a counting arrangement;

means responsive to input pulses indicating the one of the bistable circuits in the lowest ordered position of said sequence in a reset state; and means coupled to said indicating means and responsive thereto for setting said one bistable circuit and resetting all other of said bistable circuits in lower ordered positions of said sequence whereby the states of said bistable circuits after each input pulse comprise a binary coded representation of the number of input pulses received subsequent to an all-reset state for said bistable circuits.

3. The combination in accordance with claim 2 in which:

said indicating means comprises $n$ sections of gating means with each section corresponding to a different stage of said counting arrangement, each of said sections comprising a coincidence gate having active and disabled states, said gate having a first input connection for receiving said input pulses and having a second input connection for enabling said coincidence gate in response to the reset state for the corresponding bistable circuit of such section; and said setting and resetting means comprises at each of said coincidence gates an output connection for setting the corresponding bistable circuit of such stage and resetting all bistable circuits in stages in lower orders of significance.

4. The combination in accordance with claim 3 in which said indicating means further comprises, means responsive to the resetting of one of said bistable circuits inhibiting all gating means sections in positions of higher orders of significance in said sequence.

5. The combination in accordance with claim 3 in which:

additional gating means are provided with input connections coupled from all of said $n$ gating means sections; and means couple an output of said additional gating means to reset all said bistable circuits in response to an input pulse following the attainment of an all-set state of said bistable circuits.

6. The combination in accordance with claim 2 in which, said counting arrangement is free of lumped reactive elements.

7. The combination in accordance with claim 2 in which, said counting arrangement is built up of transistor-diode NAND logic gates each having substantially the same predetermined operating time delay.

8. The combination in accordance with claim 2 in which:

each of said bistable circuits has setting input connections and resetting input connections to which input signals must be applied for setting or resetting, respectively, such bistable circuit;

said bistable circuits and said indicating means are built up from transistor-diode logic circuits only; and said setting means comprises direct wire connections between an output of said indicating means and said setting input of said one of said bistable circuits and said resetting inputs of said lower order bistable circuits.

9. The combination in accordance with claim 2 in which, said counting arrangement operates in a single phase mode whereby each input pulse thereto advances the count by one.

10. The combination in accordance with claim 3 in which said indicating means further comprises:

an additional section of gating means including a further coincidence gate having active and disabled states, said further coincidence gate having a first input connection for receiving said input pulses and having a second input connection for enabling such gate in response to the simultaneous set state in all of said bistable circuits; and means coupling the output of said further coincidence gate to reset all of said bistable circuits.

11. The combination in accordance with claim 3 in which each of said $n$ sections of gating means further comprises:

first, second, and third logic gates each having disabled and active states;

said first gate connected to be responsively activated by the coincidence of a disabled state of all said coincidence gates of other ones of said sections and of an enabling signal from a section of lower order of significance in said sequence;

said second gate connected to be responsively activated by the coincidence of the disabled state of said first gate of the same section of said gating means and of the disabled state of the coincidence gate of said same section, said second gate having an output connection to said second input of the last-mentioned coincidence gate; and said third gate connected to be responsive to a disabled state of said second gate for supplying said enabling signal to said first gate of each of said sections in positions of higher order of significance in said sequence.

12. The combination in accordance with claim 3 in which each of said *n* sections of gating means further comprises:

first and second logic gates each having disabled and active states;

said first gate being connected to be responsively activated by the coincidence of the disabled state of all of said coincidence gates of said sections of higher orders in said sequence and of a reset state in the bistable circuit of the same stage in said counting arrangement for disabling said coincidence gate in sections of higher order of significance in said sequence; and said second gate being connected to be responsively activated by the coincidence of the disabled state of the coincidence gate of the same stage of said counting arrangement and the set state of the bistable circuit of the same stage of said counting arrangement for disabling the last-mentioned coincidence gate.

13. In combination:

a plurality *n* of bistable circuits having set and reset states and arranged in a predetermined ordered sequence;

means indicating the one of said bistable circuits in the lowest ordered position of said sequence which is also in said reset state, said indicating means having *n* output circuits each corresponding to a different one of said bistable circuits, said indicating means producing a pulse on only the one of said output circuits corresponding to said one bistable circuit; and means coupling said pulse to set said one bistable circuit and to reset all bistable circuits of lower order of significance in said sequence.